United States Patent [19]

Gardner

[11] Patent Number: 4,895,494
[45] Date of Patent: Jan. 23, 1990

[54] INTERCHANGEABLE MANIFOLDS FOR DIAPHRAGM PUMPS

[75] Inventor: Richard K. Gardner, Montpelier, Ohio

[73] Assignee: The ARO Corporation, Bryan, Ohio

[21] Appl. No.: 219,188

[22] Filed: Jul. 15, 1988

Related U.S. Application Data

[63] Continuation of Ser. No. 61,733, Jun. 15, 1987, abandoned.

[51] Int. Cl.[4] .................. F04B 19/00; F04B 39/10
[52] U.S. Cl. .................. 417/239; 417/393; 417/536; 417/565
[58] Field of Search .................. 417/534–536, 417/239, 565, 559, 393

[56] References Cited

U.S. PATENT DOCUMENTS

| | | | |
|---|---|---|---|
| 279,581 | 6/1883 | Moore | 417/535 |
| 862,367 | 8/1907 | Egglaston | 417/390 |
| 978,852 | 12/1910 | Cunningham | 417/239 |
| 983,865 | 2/1911 | Freeman | 417/239 |
| 1,069,894 | 8/1913 | Miner | 417/239 |
| 1,811,557 | 6/1931 | Ove | 417/565 |
| 1,834,957 | 12/1931 | Marlow | 417/559 |
| 2,751,850 | 6/1956 | Hoover | 417/565 |
| 2,843,045 | 7/1958 | Mashinter | 417/239 |
| 2,843,051 | 7/1975 | Allen | 417/239 |
| 2,969,804 | 1/1961 | Tolkien | 417/239 |
| 3,782,863 | 1/1974 | Rupp | 417/393 |
| 4,247,264 | 1/1981 | Wilden | 417/395 |
| 4,478,560 | 10/1984 | Rupp | 417/393 |

FOREIGN PATENT DOCUMENTS

| | | | |
|---|---|---|---|
| 68198 | 12/1948 | Denmark | 417/530 |
| 505473 | 12/1954 | Italy | 417/536 |
| 11068 | 5/1911 | United Kingdom | 417/536 |
| 28195 | 12/1912 | United Kingdom | 417/536 |

OTHER PUBLICATIONS

The Warren Rupp Company Publication "Entitled Operating Instructions, Service Manual Repair Parts List."

Primary Examiner—Carlton R. Croyle
Assistant Examiner—Eugene L. Szczecina, Jr.
Attorney, Agent, or Firm—Allegretti & Witcoff, Ltd.

[57] ABSTRACT

A double acting diaphragm pump includes a flat valve construction which is reversible to provide valving for both the inlet and outlet to the pumping chamber. A modular manifold construction cooperates with the flap valve construction to facilitate ease of replacement of the flap valve construction and case of repair of the diaphragm pump.

3 Claims, 3 Drawing Sheets

PRIOR ART

INTERCHANGEABLE MANIFOLDS FOR DIAPHRAGM PUMPS

This is a continuation of Ser. No. 061,733, filed June 15, 1987, abandoned.

BACKGROUND OF THE INVENTION

This invention relates to an improved, double acting diaphragm pump and more particularly to the manifold and check valve construction associated with such a diaphragm pump.

Heretofore diaphragm pumps have been commonly used for the continuous pumping of viscous fluids at a substantially constant rate or pressure. A typical construction for such a pump calls for a double acting diaphragm configuration wherein first and second pairs of chambers are arranged in opposed relation on a chassis. A flexible diaphragm separates each pair of chambers to thereby define a pressure chamber and an associated pumping chamber. Alternately increasing the decreasing pressure in the pressure chambers flexes the diaphragms to and fro to alternately increase and decrease the volume of the pumping chambers. Thus, pumping is effected. The diaphragms are usually mechanically connected by means of a shaft to insure coordinated movement.

Typically, a manifold construction connects the inlets of the two pumping chambers. A similar manifold connects their outlets. Check valves are arranged in the manifolds to ensure unidirectional flow of pumped fluid through the pumping chambers. Thus, the manifolds are connected through bifurcated passages to the inlets or outlets for the respective pumping chambers so that a single inlet and a single outlet are provided to and from the dual chamber, diaphragm pump to thereby provide a generally uniform and continuous volume or flow of pumped fluid. The flow is substantially continuous and uniform inasmuch as one pumping chamber is being filled as the other pumping chamber is emptied through the single manifold outlet. In other words, fluid from the single manifold inlet flows into one chamber of the dual chambered diaphragm pump as fluid from the opposite chamber is discharged through the manifold outlet. Opposite and equal reciprocation of the diaphragm walls ensures this continuous, uniform flow.

Heretofore diaphragm pumps included a check valve arrangement, typically a ball check valve at the inlet and outlet of each pumping chamber of the diaphragm pump. Ball check valve constructions typically are reversible to effect reversal of the direction of fluid flow through the diaphragm pump. However, typically a ball check valve diaphragm pump is not convertible into a diaphragm pump which utilizes flap check valves.

In contrast with this prior art, the present invention provides a diaphragm pump which is, in fact, easily converted from a ball check valve construction to a flap check valve construction. Additionally, the diaphragm pump of the present invention can be easily converted to reverse the direction of fluid flow through the pump.

SUMMARY OF THE INVENTION

Briefly, the present invention is an improved double acting diaphragm pump of the type which includes a pump body having dual pumping chambers. One wall of each of the chambers is defined by a diaphragm. The diaphragms are driven in unison so that as the volume of one pumping chamber is expanded, the volume of the second pumping chamber is increased due to diaphragm movement. Associated with each pumping chamber is an inlet port and an outlet port designed to be cooperative with a ball check valve.

Associated with and connected to each inlet and each outlet is an elbow manifold member which defines a passage therethrough having an exit opening with a planar surface. The planar surface is cooperative with a plate that supports a flap check valve. The plate that supports the flap check valve is constructed so that the plate can be reversed to thereby reverse the orientation and thus the operation of the flap check valve. Such reversal can be effected in order to change the passage through the elbow manifold member from an inlet to an outlet passage. The plate and associated flap check valve may thus be inserted in the diaphragm pump to replace a ball check valve.

Associated with each pair of inlet flap valves and with each pair of outlet flap valves is a single manifold tube connecting the pumping chamber inlets or outlets. The flap check valve plates sealingly engage the appropriate manifold tube.

Thus, it is an object of the invention to provide an improved double acting diaphragm pump.

A further object of the invention is to provide a diaphragm pump wherein the construction of the pump permits utilization of a ball check valve to control flow therethrough and which is convertible to use of a flap check valve to control flow of fluid therethrough.

A further object of the invention is to provide a diaphragm pump which incorporates a flap check valve mounted on a plate that is reversible within the conduit passages for the pump construction in order that the check valve may be effectively reversed and thus reverse the controlled flow of fluid through the pump.

Another object of the invention is to provide an improved diaphragm pump construction which has a reduced number of parts for control of fluid flow therethrough.

Yet a further object of the invention is to provide an improved diaphragm pump which is easily assembled and disassembled.

Yet another object of the invention is to provide an improved diaphragm pump wherein a flap valve is reversibly positioned within a conduit leading to a diaphragm pumping chamber.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
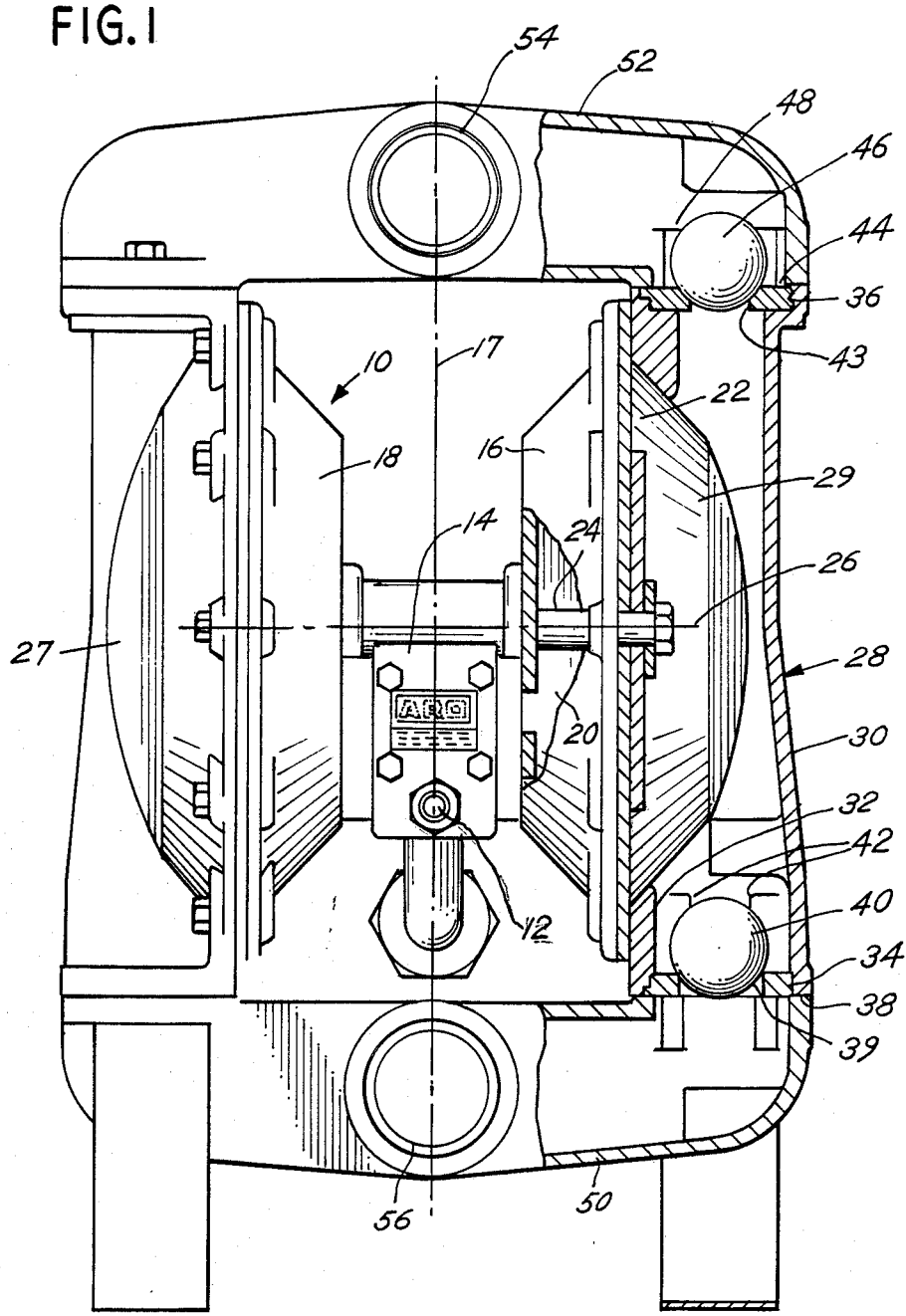
FIG. 1 is a plan view, partially in section, depicting a typical prior art diaphragm pump utilizing ball check valves to control flow of fluid through the diaphragm pumping chamber of the pump.

FIG. 1 illustrates a typical prior art, double acting or dual chamber diaphragm pump. Typically the pump is air operated and includes a main body 10 with an air inlet conduit 12 connected to a flow control device 14. The flow control device 14 controls the flow of pressurized air and the exhaust of such air from chambers associated with the operation of the pump. Thus, the body 10 includes a first pressure chamber housing 16 and a second pressure chamber housing 18. Housing 16 is a mirror image of housing 18 with axis 17 being the effective mirror plane. Therefore, referring to the pressure chamber housing 16 as exemplary, that housing 16 defines a chamber 20 adapted to receive pressurized air. The chamber 20 has as one of its walls a flexible diaphragm 22 which is sealed about its edges to the housing 16. Thus, increase in pressure within the chamber 20 will cause the diaphragm 22 to flex outwardly or to the right in FIG. 1.

The diaphragm 22 is attached to a shaft 24 which projects through the body and connects to a diaphragm within the housing 18 that is arranged as a mirror image of the diaphragm 22. The diaphragm 22 thus moves back and forth transversely to a center line axis 26 in syncopation with movement of the shaft 24 and in unison in the same direction as the diaphragm within the housing 18.

The diaphragm 22 is maintained against the housing 16 in a sealing relationship by a pumping chamber housing 28. The housing 28 includes a rigid outer wall 30 opposite the diaphragm 22, a circumferential flange 32 which cooperates with the diaphragm 22 and the housing 16, a first passage 34 as well as a second passage 36. Housing 28 thus defines pumping chamber 29.

The passage 34 is preferably circular and receives a check valve seat plate 38 defining a circular seat 39 which supports a check valve ball 40. The heck valve ball 40 is held in position by retainer bars or a cage 42. An inlet manifold 50 cooperates with the seat plate 38 and the passage 34.

In a similar fashion, the passage 36 receives a seat plate 44. A check valve ball 46 retained by a cage 48 cooperates with a circular seat 43 defined by the seat plate 44. An outlet manifold 52 cooperates with passage 36 and plate 44 to retain the plate 44 in the position depicted in FIG. 1.

The construction of FIG. 1 operates in the following manner: As the air through the pressurized conduit 12 is controlled by the control device 14, air flow into the chamber 20 causes the diaphragm 22 to move to the right in FIG. 1. Simultaneously, air pressure in the housing 18 is exhausted. The diaphragm 22 moves to the right as does the shaft 24 and the diaphragm within the housing 18. This causes any fluid within chamber 29 to be compressed and flow past the ball check valve 46. Simultaneously the ball check valve 40 is seated on the plate 38. Fluid then flows through an outlet 54 of manifold 52. Simultaneously fluid through an inlet 56 flows through the manifold 50 past a ball check valve associated with the housing 27 and its associated fluid chamber. Because the manifold 52 is filled with fluid which is pressurized, the ball valve associated with outlet from the chamber housing 27 is seated. Thus, as fluid is pumped from the chamber 29, fluid is also filling the companion chamber associated with the housing 27. Then as the diaphragm 22 and shaft 24 are reciprocated in the opposite direction along the axis 26, the opposite pumping action occurs. That is, fluid is drawn into the chamber 29 and pumped from the chamber associated with housing 27 through outlet 54.

The concept of reciprocating a parallel pair of diaphragms to define a double diaphragm pump for the pumping of various fluids from a single inlet 56 through a single outlet 54 is known. Therefore, the construction described with respect to FIG. 1 is considered to be prior art.

FIGS. 2-7 illustrate the improvement of the invention and a preferred embodiment of the present invention. In FIGS. 2-7, as contrasted with the embodiment of FIG. 1, substitute component parts are provided to replace the manifolds 50 and 52, the ball valves 40 and 46, the seat plates 38 and 44, as well as the ball valves and seat plates associated with housing 27. However, the remainder of the double diaphragm pump is as depicted in FIG. 1.

The manifolds 50 and 52 as well as the ball valves 40 and 46 and the plates 38 and 44 are replaced by a universal inlet/outlet manifold conduits 60, a universal connecting elbow manifold or conduits 62 and a special flap check valve construction 64. Thus, the assembly uses two universal inlet/outlet conduits 60A, 60b, four elbow conduits 62A, 62B, 62C, 62D, and four flap check valve constructions (65A, 64B are shown) substituted for the previously described component parts. Again, the construction of the double diaphragm pump is such that the component parts of the pump are essentially a mirror image on opposite sides of the mirror plane or axis 17 in FIG. 2. Thus, description of the diaphragm pump mechanism on the right hand side of the plane 17 will constitute a description of the mirror image thereof on the let hand side. Also, with respect to the construction shown in FIG. 2 as compared with the prior art construction of FIG. 1, like parts have like numbers.

Figure 2:
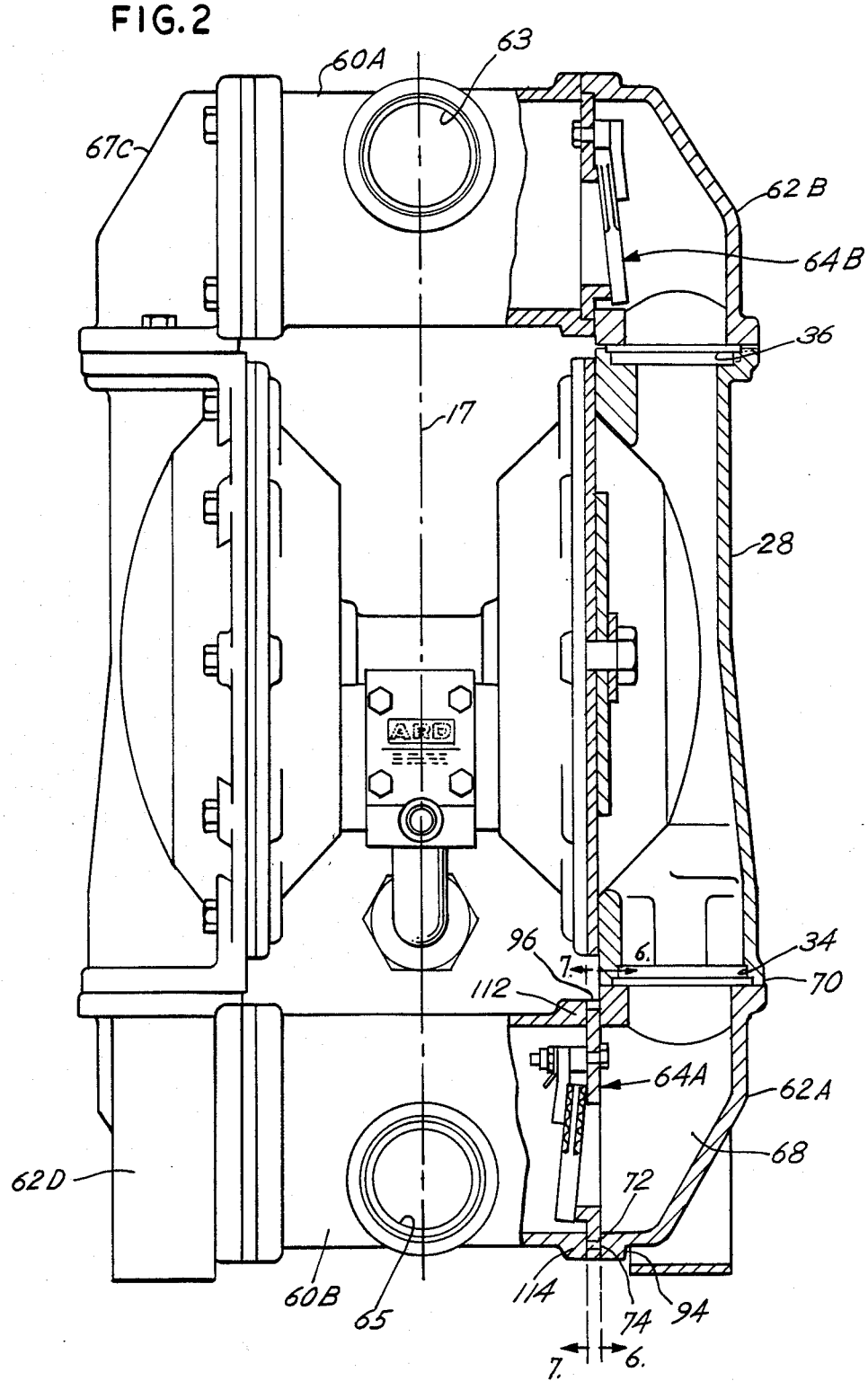
FIG. 2 is a plan view similar to FIG. 1 wherein the diaphragm pump utilizes flap check valves and the improved manifold construction of the present invention.

The center section or housing 28 has an identical construction in the pumps of FIGS. 1 and 2. However, the set plates 38 and 44 have been removed from the housing 28 of FIG. 1 with the associated passages 34 and 36 remaining. As shown in FIG. 2, a universal elbow 62A is provided and includes a right angle throughbore passage 68 having a planar seat 70 or sealing against the periphery of a passage, for example passage 34, of housing 28. Note that in every instance the surface 70 is designed to seal against an appropriate mating surface defining a passage into a housing, for example housing 27 or housing 28. The elbow 62A is fastened or attached to the housing 28, for example, by means of a clamp or other fasteners (not shown).

Figure 3:
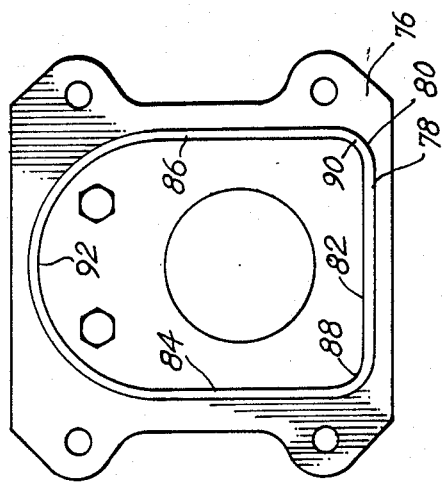
FIG. 3 is a plan view of the flap check valve of the invention from a first side of the plate supporting the flap check valve.
Figure 6:
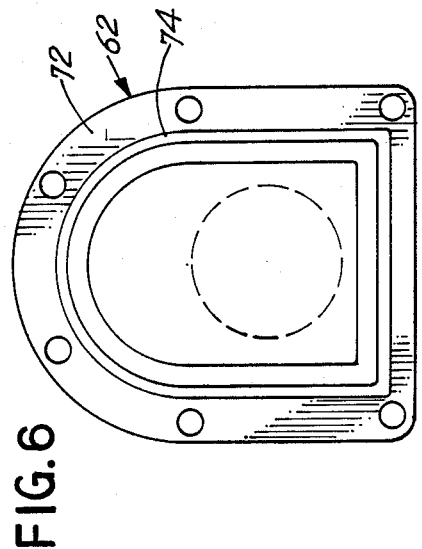
FIG. 6 is a sectional view taken along the line 6—6 in FIG. 2.

Importantly, the elbow section or conduit 62A also includes a planar sealing surface 72 at its opposite side, FIG. 6. Thus, two sealing surfaces 70, 72 are provided at opposite ends of the passage 68. The sealing surface 72 is a planar surface which includes a peripheral groove 74. The general configuration of the opening through the surface 72 is reflected by the plan view of FIGS. 3 and 6. In FIG. 3, a plate 76 associated with the flap valve construction or assembly 64A includes a closed loop groove or channel 78. The channel 78 is adapted to receive an O-ring 80 which seals the plate 78 against the surface 72.

It should be noted as shown in FIG. 6 that the configuration of the passage 68 as it exits through the surface 72 is generally defined by the configuration of the groove 78. That is, the groove 78 has a generally straight line segment 82, connecting legs 84 and 86 which are generally transverse to the segment 82 and connected thereto through rounded or radius corners 88 and 90. The leg sections 84 and 86 are connected by a smooth generally uniform radius, curved section or crown 92. The groove 78 thus defines a closed loop having a configuration which matches the configuration of the passages 68 through the surface 72. In this manner an O-ring 80 within the groove 78 will seal against the surface 72 or be received by a groove 74 in surface 72.

Figure 5:
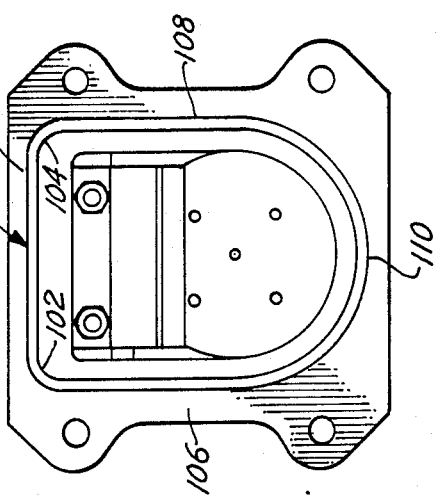
FIG. 5 is a plan view of the opposite side of the flap check valve shown in FIG. 3.
Figure 7:
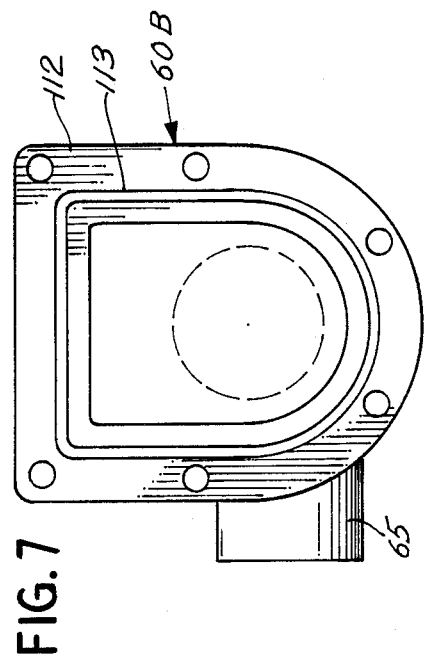
FIG. 7 is a sectional view taken along the line 7—7 in FIG. 2.

Referring to FIG. 5, the plate 76 includes another groove 98 on its opposite side. The groove 98 also includes a straight section 100 connected to leg sections 106 and 108 by curved or radius corners 102 and 104, respectively. Leg sections 106, 108 extend transversely from the section 100. The leg sections, 106 and 108 are connected by a smooth, generally uniform radius curved segment 110. The straight section 100 in FIG. 2, when positioned in communication with the inlet manifold 60B, engages against a generally flat surface 112 in FIG. 7 through which a passage of the manifold tube 60B extends. The surface 112 of the manifold 61 is shaped so as to define a passage compatible with the shaped groove 98 and optionally included a groove 113 coincident with groove 110.

Figure 4:
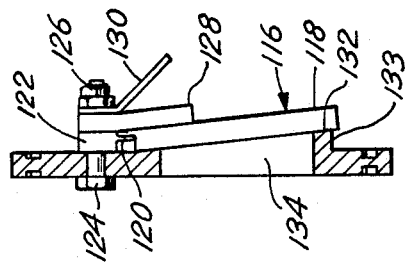
FIG. 4 is a side plan view of the flap check valve of FIG. 3.

Referring to FIG. 4, flap valve construction 64 includes a flap valve 116 defined by a generally circular flap 118 connected by a flexible hinge member 120 to a generally rectangular pad 122. The pad 122 is held on the plate 76 by bolts 124 cooperating with nuts 126. A generally rectangular stop block 128 is also held by the bolt 124 and nut 126. The stop block 128 is fabricated from a generally flexible, elastomeric material which tends to bias the flap 118 toward the closed position as illustrated in FIG. 4. A metal stop plate 130, also held by bolts 124 and nuts 126, limits the pivotal movement of the flap 118 and block 128. The flap 118 cooperates with a seat 132 defined by a circumferential flange or ridge 133 defining a passage 134 through the plate 76.

Normally the plate 76 is oriented in a vertical position as illustrated in FIG. 2, for example. Further, the orientation of the plate 76 is arranged such that the cover 118 extends vertically downward so that gravity will tend to cause the flap valve 116 defined by the cover or flap 118 to remain in the closed position. Pumping action due to operation of the diaphragm, e.g. diaphragm 22, will thus cause the flap 118 to move in opposition to the force of the elastomeric block 128.

It will be noted that each of the flap valve constructions 64A, 64B is substantially identical as is each of the elbows 62A, 62B, 62C, 62D and each of the manifolds 60A and 60B. These component parts are merely juxtaposed relative to one another in order to define inlet and outlet check valves for the double diaphragm pump.

Thus, referring again to FIG. 2, a flap valve construction 64A is arranged so that the valve 116 or flap 118 will be opened upon impingement of pressurized fluid against that flap 118. Fluid will then flow through an outlet 65 in manifold 60B. This occurs when the diaphragm 22 is driven to the right in FIG. 2 thereby reducing the volume within the housing 28 and causing fluid or material therein to flow through the flap valve construction 64A in FIG. 2. Simultaneous with the opening of the valve 64A, the valve construction 64B in FIG. 2 is maintained in the closed position due to the pressurization of fluid within the chamber 29 of housing 28. That is, fluid acts against the cover or flap 118 of the valve construction 64B thereby causing that cover 118 to seal against the seat 132 and prevent flow of fluid from the housing 28 through the valve construction 64B.

Again, it is noted that because of the configuration of the elbow passages 62 and their associated cooperative plates 76, as well as the manifolds 60 and 61, a common valve construction 64 can be used between each elbow 62 and associated manifold 60 to control fluid flow direction through the double diaphragm pump. Thus, the valve constructions 64 associated with the housing 27 and the other diaphragm constitute the mirror image on the opposite side of the axis 66 as previously described. In the configuration as shown in FIG. 2 then, the passage 63 to the manifold 60A serves as an inlet common to both housings 27 and 28. The manifold 60B and its outlet 65 similarly serve both housings 27 and 28.

An advantage of the flap valve construction 64 described is that when the pump is at rest, fluid may easily drain past the valve covers 118 through the outlet thereby avoiding the formation of a blockage in the pump in the embodiment having the valve configuration shown in FIG. 2. This avoids damage to the pump which would cause it to quit cycling. Further, with the construction of the present invention, a common flap valve construction 64 is used in each of the four positions defined. This avoids the necessity for providing a custom made valve for each of those four valves. Further, the pump can be easily repaired without total disassembly. Further, the pump may be converted from the flap valve construction of FIG. 2 to the ball valve construction of FIG. 1 merely by placing a separator in place of the flap valve plate 76 and reinserting the ball valves as depicted in FIG. 1 by the use of an appropriate ball and seat plate as previously described. The direction of operation of the pump may be effectively reversed by interchanging the upper and lower flap valves., e.g., flap valves 64b and 64a on each side of the double acting diaphragm pump as will be appreciated by one of ordinary skill in the art.

Various combinations and permutations of the described invention are possible. Thus, the invention is to be limited only by the following claims and their equivalents.

What is claimed is:
1. In a double acting diaphragm pump of the type including (i) a pump body, (ii) a first and a second pressurized chamber in the body, (iii) a first diaphragm in the first chamber linked to a second diaphragm in the second chamber, (iv) first and second fluid flow passages to each chamber, and (v) pumping means to reciprocally displace the linked diaphragms in their respective chambers for pumping action in the chambers and their associated first and second fluid flow passages, the improvement comprising in combination:
   (a) said first and second fluid flow passages each being adapted to (i) removably retain a check valve and (ii) sealingly engage a manifold providing means for directing fluid flow to or from the check valve;
   (b) at least four reversible flap check valves, each including (i) a planar support plate having a peripheral seal on its opposing planar surfaces, (ii) a plate fluid passage for fluid flow through the plate, (iii) a generally planar flap member adapted to cover the plate fluid passage on one side of the plate, and (iv) hinge means along one side of the flap member for attaching the flap member to the plate and maintaining the flap member in a cooperative relationship with the plate whereby fluid pressure on one side of the flap member pivots the flap member about the hinge to open the flap check valve and fluid pressure on the opposite side pivots the flap member into sealing engagement with the plate; and (c) at least a first manifold and second manifold, each of said manifolds including (i) manifold sealing channels for sealing and removable engagement with the fluid flow passages, and (ii) two opposing planar plate sealing surfaces, each defining means for removable sealing cooperation with the opposing sides of the planar support plate of an associated flap check valve; said reversible flap check valves of one of said first and second manifold being reversible with respect to said reversible flap check valves of the other of said first and second manifold to reverse the direction of permitted fluid flow as determined by the orientation of the flap check valves in the associated manifold, whereby the housings, passages, and manifolds of the pump are retained in an identical configuration regardless of the direction of fluid flow through the pumping chambers, the peripheral seal on the opposite sides of the manifold plate having an identical non-circular shape and oriented in opposite directions on the opposite sides of the plate, the manifold sealing channel cooperative with the peripheral seal to orient the flap check valve with the hinge means vertically above the flap member regardless of the direction of fluid flow through the valve.

2. The improvement of claims 1 wherein the manifolds extend horizontally along the top and bottom of the pump and further wherein the fluid flow passages connected to the manifolds includes a universal elbow having a peripheral seal of identical non-circular shape with the peripheral seal on the opposite sides of the valve plate.

3. The improvement of claim 2 wherein the peripheral seal of the elbow is always oriented opposite the orientation of the peripheral seal on the manifold attached thereto.

* * * * *

UNITED STATES PATENT AND TRADEMARK OFFICE
CERTIFICATE OF CORRECTION

PATENT NO. : 4,895,494

DATED : January 29, 1990

INVENTOR(S) : Richard K. Gardner; Gerald E. Smith; William R. Tate

It is certified that error appears in the above-identified patent and that said Letters Patent is hereby corrected as shown below:

On the title page, item [75], add the following inventors:

--Gerald E. Smith,
  Bryan, OHio;
  William R. Tate,
  Bryan, Ohio--.

Signed and Sealed this

Thirtieth Day of June, 1992

*Attest:*

DOUGLAS B. COMER

*Attesting Officer*    *Acting Commissioner of Patents and Trademarks*